(12) United States Patent
Odziemczyk et al.

(10) Patent No.: US 11,086,641 B2
(45) Date of Patent: Aug. 10, 2021

(54) LOGGING USER INTERFACE ACTIVITY WITH CONTROL PLACEMENT AND ACTIVITY INFORMATION

(71) Applicant: EMC IP Holding Company LLC, Hopkinton, MA (US)

(72) Inventors: Anna Agnieszka Odziemczyk, Cork (IE); Michael William Hurley, Cork (IE)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 0 days.

(21) Appl. No.: 16/526,162

(22) Filed: Jul. 30, 2019

(65) Prior Publication Data
US 2021/0034385 A1 Feb. 4, 2021

(51) Int. Cl.
*G06F 9/451* (2018.01)
*H04L 29/08* (2006.01)
*G06F 3/0482* (2013.01)
*G06F 11/34* (2006.01)
*G06F 3/0481* (2013.01)

(52) U.S. Cl.
CPC ............ *G06F 9/451* (2018.02); *G06F 3/0481* (2013.01); *G06F 3/0482* (2013.01); *G06F 11/34* (2013.01); *H04L 67/22* (2013.01)

(58) Field of Classification Search
CPC ........ G06F 9/451; G06F 3/0482; G06F 11/34; G06F 3/0481; H04L 67/22
See application file for complete search history.

(56) References Cited

U.S. PATENT DOCUMENTS

| | | | | |
|---|---|---|---|---|
| 5,475,843 A | * | 12/1995 | Halviatti | G06F 9/45512 717/108 |
| 7,523,191 B1 | * | 4/2009 | Thomas | G06F 11/3438 709/202 |
| 7,653,721 B1 | * | 1/2010 | Romanov | G06F 9/451 709/224 |
| 10,430,212 B1 | * | 10/2019 | Bekmambetov | G06F 16/71 |

(Continued)

OTHER PUBLICATIONS

"Greenplum database—GPDB." DBARefGPDBlib—http://www.dbaref.com/greenplum/. Last Accessed Oct. 18, 2019. 15 pages.

*Primary Examiner* — Roberto Borja
(74) *Attorney, Agent, or Firm* — Amin, Turocy & Watson, LLP

(57) ABSTRACT

The described technology is generally directed towards logging activity of a user interface in a web application. According to an embodiment, a system can comprise a processor, and a memory that stores executable instructions that, when executed by the processor, facilitate performance of operations, that include receiving user interface information describing a user interface of the web application. The operations can further include receiving activity information corresponding to operation of the user interface, and the activity information can comprise an indication of a user interface event comprising placement information for a user interface control of the user interface that triggered the user interface event. The operations can further include combining the user interface information with the activity information, resulting in a log of the operation of the user interface.

20 Claims, 10 Drawing Sheets

(56) References Cited

U.S. PATENT DOCUMENTS

| | | | |
|---|---|---|---|
| 2015/0234558 A1* | 8/2015 | Ichikawa | G06F 3/0481 |
| | | | 715/800 |
| 2016/0231876 A1* | 8/2016 | Wang | G06F 3/041 |
| 2019/0124167 A1* | 4/2019 | Reshef | H04L 43/00 |
| 2019/0278438 A1* | 9/2019 | Boyd | H04L 67/32 |
| 2020/0356395 A1* | 11/2020 | Deng | G06F 9/451 |

* cited by examiner

```
public onInvokeZoneTask = (delegate: ZoneDelegate, current: Zone, target: Zone, task: Task, applyThis: any, applyArgs: any)=>
{
    if(!_.isNil(this.usageTrackingData)&&task.source=="HTMLDocument.addEventlistener:pointerup")
    {
        let activeElement:HTMLElement=_.get(task,"target.activeElement") as HTMLElement;
        this.usageTrackingData.addComponentAction(
            this.currentZone,
            activeElement.id,
            activeElement.nodeName,
            UIActionType.CLICK,
            this.getContextQ,
            activeElement.offsetLeft,
            activeElement.offsetTop,
            activeElement.offsetWidth,
            activeElement.offsetHeight);
    }
};
```

- 440 (HTMLDocument.addEventlistener:pointerup)
- 415 (activeElement block)
- 430 (offset block)
- 400

```
{
    "unisphereVersion":"X9.1.0.629",
    "sessionKey":{
        "sessionId":"901785913",
        "userId":"714820877",
        "sessionStartTime":1543424347
    },
    "sessionEndTime":1543424356,
    "serverHostName":"1535746209",
    "thinClient":{
        "userAgent":"Mozilla/5.0 . . .
        "screenWidth":1024,
        "screenHeight":1280
    },
    "visitedZones":[
        {
            "zoneKey":{
                "name":"datacenter",
                "templateUrl":"component/em_smc/src/main/ts/
                              datacenter/view/DataCenterView.html",
                "controllerName":"DataCenterController"
            },
            "actions":[
                {
                    "invocationTimes":[
                        1543424347
                    ],
                    "actionType":"LOAD",
                    "context":"ALL_SYSTEMS",
                    "locationUrl":"datacenter"
                }
            ],
            "components":[

],
            "overlay":false
        },
```

510 ⟶ (points to "sessionEndTime" area)

520 ⟶ (points to "visitedZones" area)

*FIG. 5*

LOGGING USER INTERFACE ACTIVITY WITH CONTROL PLACEMENT AND ACTIVITY INFORMATION

TECHNICAL FIELD

The subject application generally relates to web-based applications, and, for example, to logging user interface (UI) activity of web-based applications, and related embodiments.

BACKGROUND

Modern applications increasingly use records of UI activity to improve the operation of applications, e.g., by identifying where users are having problems and modifying the UI to try to prevent future problems. When logging UI activity, in some circumstances it is not sufficient to just log the actions performed by a user, rather, a more detailed record of the use of UI controls can be required, e.g., logging of the pressing of buttons, filling in of text boxes, checking of check boxes, and other similar UI activities.

Detailed records of UI control activities can be difficult to obtain with many types of programs, with the use of web-based application UI controls being especially difficult to track in some circumstances. Tracking programs can be designed to capture web-based UI activities, but in many cases, not enough information is provided to obtain the detail required. Many types of web-based applications can have these problems, with single-page web applications in some circumstances, being among the most difficult applications for the tracking of detailed UI activities.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

According to an embodiment, a device can comprise a processor, and memory that stores executable instructions that, when executed by the processor, facilitate performance of operations, that include receiving user interface information describing a user interface of the web application. The operations can further include receiving activity information corresponding to operation of the user interface, wherein the graphical pointer activity information can comprise an indication of a user interface event, comprising placement information for a user interface control of the user interface that triggered the user interface event. The operations can further include combining the user interface information with the activity information, which can result in a log of the operation of the user interface. In other embodiments of the device, the placement information for the user interface control can comprise a predefined zone of the user interface where the user interface control is located, with the user interface information comprising the predefined zone information, and an identifier can be generated for the user interface control based on the predefined zone and the indication of the user interface event. In other embodiments of the device, the user interface control can be generated based on hyper-text markup code without the identifier assigned to the user interface control, and the log of the operation of the user interface can comprise the identifier generated for the user interface control and the indication of the user interface event.

In other embodiments of the device, the user interface can be displayed on a single web page with code of the user interface being retrieved for display by a single-page load. In other embodiments of the device, the placement information for the user interface control can comprise a size of the user interface control. In other embodiments of the device, the size of the user interface control can comprise a relative size of the user interface control compared to the user interface. In other embodiments of the device, the placement information for the user interface control can comprise coordinates of a displayed position of the user interface control in the user interface. In other embodiments of the device, the user interface control comprises a graphical button, and wherein the user interface event is a click of the graphical button by a graphical pointer.

According to another embodiment, a computer-implemented method can comprise determining, by a first device comprising a processor, user interface information describing a user interface of a web-based application. The method can further include receiving, by the first device, activity information corresponding to operation of the user interface, wherein the activity information comprises an indication of a user interface event, comprising placement information for a user interface control of the user interface that triggered the user interface event. The method can further include facilitating, by the first device, communication of the activity information and the user interface information to a second device for combining, by the second device, the user interface information with the activity information, to result in a log of the operation of the user interface. In other embodiments of the method, the placement information for the user interface control can comprise a predefined zone of the user interface where the user interface control is located, and the user interface information can comprise the placement information, and the log of the operation of the user interface can comprise an identifier for the user interface control generated by the second device based on the predefined zone and the activity information. In other embodiments of the method, the user interface control can be generated based on hyper-text markup code without the identifier assigned to the user interface control, and the log of the operation of the user interface can comprise the identifier generated for the user interface control and the indication of the user interface event. In other embodiments of the method, the user interface can be displayed on a single web page with code of the user interface being retrieved for display by a single-page load. In other embodiments of the method, the placement information for the user interface control can comprise a size of the user interface control. In other embodiments of the method, the size of the user interface control can comprise a relative size of the user interface control compared to the user interface. In other embodiments of the method, the placement information for the user interface control can comprise coordinates of a displayed position of the user interface control in the user interface. In other embodiments of the method, the user interface control can comprise a graphical button, and wherein the user interface event is a click of the graphical button by a graphical pointer.

According to another embodiment, a computer program product is provided. The computer program product can comprise machine-readable storage medium comprising executable instructions that, when executed by a processor, can facilitate performance of operations comprising receiving user interface information describing a user interface of an application. The operations can further include receiving activity information corresponding to operation of the user interface, wherein the activity information comprises placement information for a user interface control of the user interface that triggered a user interface event. The operations can further include combining the user interface information with the activity information, resulting in a log of the operation of the user interface.

BRIEF DESCRIPTION OF THE DRAWINGS

The technology described herein is illustrated by way of example and not limited in the accompanying figures in which like reference numerals indicate similar elements, and in which:

FIG. 4 depicts an example of code that can implement the identification of a particular UI control based on the event output of an event, in accordance with one or more embodiments.

FIG. 5 depicts an example JavaScript Object Notation (JSON) file that can include example activity log data for a UI, in accordance with one or more embodiments.

DETAILED DESCRIPTION

Various aspects described herein are generally directed concepts that include facilitating the identifying and logging of the use of a UI in circumstances where UI controls are not fully identified at run-time, in accordance with one or more embodiments. As will be understood, the implementation(s) described herein are non-limiting examples, and variations to the technology can be implemented.

Reference throughout this specification to "one or more embodiments," "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

The computer processing systems, computer-implemented methods, apparatus and/or computer program products described herein employ hardware and/or software to solve problems that are highly technical in nature (e.g., evaluating, weighting, and scheduling the use of network links), that are not abstract and cannot be performed as a set of mental acts by a human. For example, a human, or even a plurality of humans, cannot efficiently, accurately, and effectively manually perform many of the activities described herein, with the same level of accuracy and/or efficiency as the processes described by the various embodiments described herein.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

As noted above, web-based application UI controls can be especially difficult to track in some circumstances, with single-page web applications being especially challenging. An example challenge of UI usage tracking for single-page web applications involves the identifying of areas/pages of the UI and linking these areas with UI events that have occurred, e.g., button clicks, check box checking, and other similar UI activities. One or more embodiments described herein can improve the collection of UI activity information by approaches that include, but are not limited to, assigning IDs to UI controls at run-time based on a location of the control in the UI. Additional approaches and detailed descriptions of embodiments are provided for illustration below.

Figure 1:
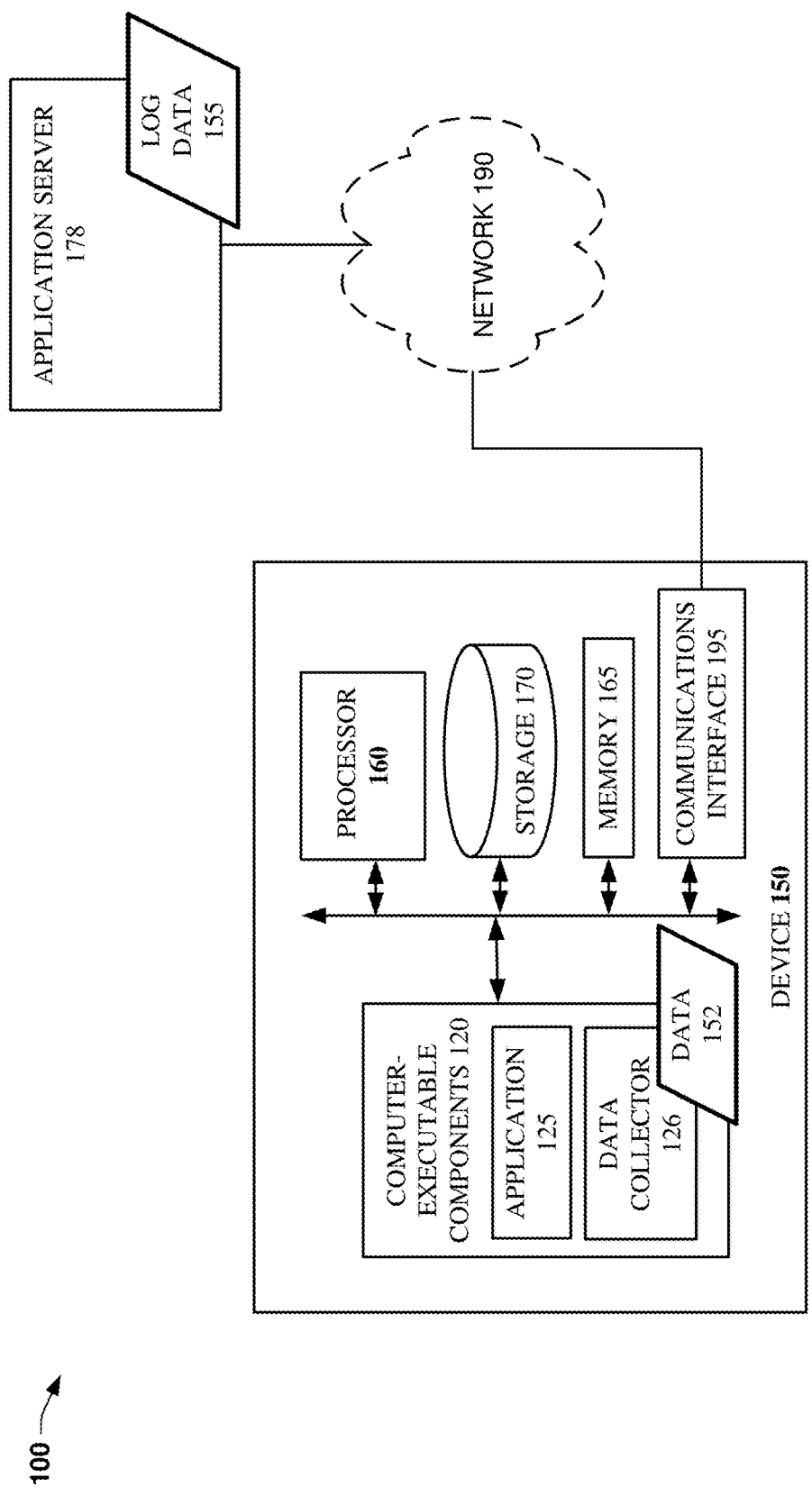
FIG. 1 illustrates a block diagram of an example, non-limiting system that can facilitate identifying and logging the use of a UI in circumstances where UI controls are not fully identified at run-time, in accordance with various aspects and implementations of the subject disclosure.

FIG. 1 illustrates a block diagram of an example, non-limiting system 100 that can facilitate identifying and logging the use of a UI in circumstances where UI controls are not fully identified at run-time, in accordance with various aspects and implementations of the subject disclosure.

As depicted, device 150 includes processor 160, storage 170, memory 165, communications interface 195, and computer-executable components 120. As discussed further below with FIG. 10, in some embodiments, memory 165 and storage 170 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 and storage 170 are described below with reference to system memory 1016 and FIG. 10. Such examples of memory 165 and storage 170 can be employed to implement any embodiment of the subject disclosure.

According to multiple embodiments, processor 160 can comprise one or more types of processors and/or electronic circuitry that can implement one or more computer and/or machine readable, writable, and/or executable components and/or instructions that can be stored, e.g., in memory 165. For example, processor 160 can perform various operations that can be specified by such computer and/or machine readable, writable, and/or executable components 120 and/or instructions including, but not limited to, logic, control, input/output (I/O), arithmetic, and/or the like.

In one or more embodiments, in an example approach to implementing one or more embodiments described herein, processor 160 can execute computer-executable components 120, that can include application 125 and data collector 126. It should be noted that example components depicted with figures referenced herein are included as examples, and the features of the component can be combined during implementation. For example, while computer-executable components 120 can include the components described herein as distinct components, in alternative implementations these functions can be closely integrated, e.g., being performed together, and not independent processes, as described herein.

It should be noted that, many examples described herein are based on web-based applications that can be termed "single" page applications, e.g., applications with fewer page transitions to different pages during operation of the application, potentially only having a single main interface view. One reason that these types of applications can be hard to log is because, having fewer transitions from UI page to UI page can mean that the page uniform resource locator (URL) may not change. Because URL transitions require server requests, these types of events can provide more easily loggable information. Instead of page navigation, e.g., changing to as new UI view with a different URL, the HyperText Markup Language (HTML) page content of the single-page web application can be loaded into a part of the view (e.g., a zone, as described herein) as opposed to loading an entire new page. As described further below, one or more embodiments can utilize these zones to identify and log UI activities, thereby improving the logging of these types of applications, as well as other types of applications described below.

Returning to the components of FIG. 1, in one or more embodiments application 125 can be operating on device 150, performing different functions. In an example, application server 178 can be configured to collect UI usage data from the operation of device 150, e.g., as a vendor monitoring the operation of application 125 by a client. One reason that this monitoring could be beneficial is that it can facilitate the assessment of customer demand for particular application features and functions. In one or more examples discussed herein, this data collection is prevented for different reasons, and one or more embodiments can circumvent these restrictions and provide data 152 to application server 178, to be processed into log data 155.

Continuing this example, application 125 can be a thin-client (e.g., browser executed) application, and data collector 126 can collect UI usage data for the operation of application 125. One or more embodiments can improve the collection of this data (e.g., addressing limitations in information that can exist with thin-client application 125), as well as the communication of this information from device 150 to application server 178. As noted above, the examples presented herein are intended to be non-limiting, and other variations of embodiments are possible, including different types of applications (e.g., non-web-based) and different data collected (e.g., more or less detailed collections).

In the context of providing additional details about application server 178, the description of FIG. 2 below describes different approaches used by data collector 126 to collect data and otherwise how one or more embodiments can address different issues identified above.

Figure 2:
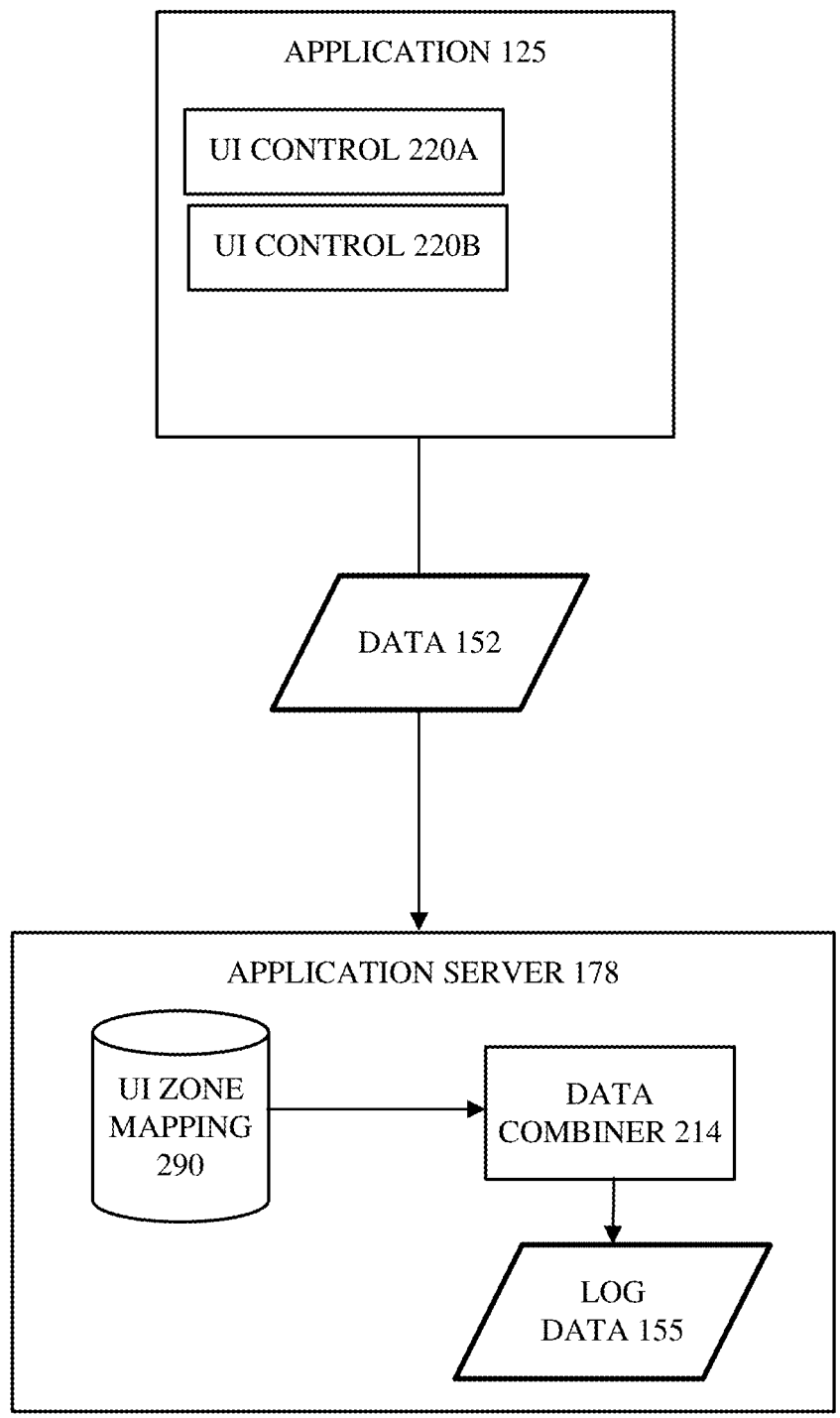
FIG. 2 depicts a non-limiting example of application server combining data with UI zone mapping information to generate log data, in accordance with one or more embodiments.

FIG. 2 depicts non-limiting example 200 of application server 178 combining data 152 with UI zone mapping information 290 to generate log data 155, in accordance with one or more embodiments. Repetitive description of like elements and/or processes employed in respective embodiments is omitted for sake of brevity.

In one or more embodiments data 152 can be data collected based on the operation of data collector 126 collecting data from application 125. As depicted in FIG. 2, application 125 has two UI controls 220A-B, with the manipulation these controls being an example of the UI activity logged by one or more embodiments. In different implementations of UI control 220A-B, these controls can be implemented with a logical identifier that can, for example, facilitate logging activities associated with these controls, e.g., UI control 220A button, with identifier 123, was clicked at a particular time. In an example where application 125 is a web-based application and UI controls 220A-B are HTML elements, this identifier can be the ID property of the HTML statement that implements the UI control. One or more embodiments can provide logging advantages for UI controls 220A-B having identifiers, as well as alternative examples discussed below, where UI controls 220A-B do not have identifiers.

In web-based applications, UI components are typically identified across a webpage by using the ID attribute in an HTML markup element. However, if a value for the ID attribute has not been added to an HTML element, it may be to be difficult to identify the component on the page, e.g., for logging activities associated with the UI control. As noted above, this problem can occur in single-page applications, because URL transitions do not occur frequently to indicate the flow of the application.

Describing this alternative example, in the implementation of application 125, UI controls 220A-B may have no identifiers for a variety of reasons, including reducing the amount of time it takes to program the application. Security provides another reason to generate HTML UI controls without IDs, e.g., because UI controls with identifiers can potentially be operated by an automated process, that is, not by a user, rather by a potentially malicious program with the capability of rapidly operating the UI. For whichever reasons caused UI controls 220A-B not to have identifiers assigned at design time, retroactively assigning identifiers to UI elements in applications can result in a long refactoring effort, while also introducing the possibility of coding errors. Moreover, assigned identifiers, if used, can frequently be tightly coupled to the application code, making activities including the switching of code libraries more difficult, if needed.

Thus, in this example, as with one or more embodiments, identifiers for UI controls 220A-B are not assigned during the operation of application 125, but many of the approaches described herein can identify events generated by UI controls 220A-B so as to provide detailed logging of the operation of the UI of application 125, e.g., by using pre-defined zones, zone-based events, as described below. In addition, one or more embodiments can dynamically identify and add identifiers to UI elements, based on the pre-defined zones.

One way that one or more embodiments can identify UI elements is to use a development environment with zone-based events, such as the ng-click event in the ANGULAR JS development environment. Different implementations of ANGULAR JS can comprise a script-based front-end web framework that includes operations to facilitate developing single-page applications.

One such event that can be used one or more embodiments is the ng-click event. Generally speaking, this event (also termed a directive), is a mouse event, e.g., occurring when a mouse pointer moves over an element, or when a mouse button is clicked with the mouse pointer on an element, such as with ng-click. In ANGULARJS, this event can define ANGULAR JS code to be triggered when a UI element is clicked. One feature of ng-click that can facilitate different embodiments described herein, is the data value that can be determined upon the occurrence of the event, e.g., provided to the system based on an event handler.

As described herein, ng-click and similar events can be termed zone-based events because in some circumstances, upon triggering of these events (e.g., clicking on UI control 220A) different identifying characteristics of the triggering UI control 220A can be provided, including a pre-defined zone on the UI screen in which the UI control 220A is displayed. In one or more embodiments, the ZoneJS library can facilitate the capturing of the events and the linking of the events to pre-defined zones (e.g., also termed view areas or view zones). In one or more embodiments, the ZoneJS library can define zones as an execution context that can persist across asynchronous tasks. It should be noted that this use of particular libraries to implement different aspects of one or more embodiments is not intended to be limiting, and other similar approaches can also be used by one or more embodiments.

Additional information that can be provided with zone-based events utilized by one or more embodiments include, but are not limited to, for the triggering UI control 220A: the HTML element type, its position, and size of the element on the page, e.g., variables including offsetTop, offsetLeft, offsetwidth, offsetHeight. Generally speaking, as described further below, although in this example, UI control 220A does not have an assigned identifier when an activity is detected, by using at least one zone information, characteristics of UI control 220A, and position of UI control 220A, combined with a description of the structure of the UI (e.g., UI zone mapping 290), one or more embodiments can identify the UI elements used, and assign run-time identifiers, if needed.

To provide additional details, FIG. 3 discussed below, depicts an example single-page application with multiple UI controls in different zones, and FIG. 4 depicts example code that can facilitate the logging of UI activities by one or more embodiments. It should further be noted that, although the components shown in FIGS. 1-2 can provide details for many different embodiments, application server 178 can, in one implementation execute an instance of the UNISPHERE application supporting a POWERMAX Server (e.g., device 150), provided by DELL EMC.

Figure 3:
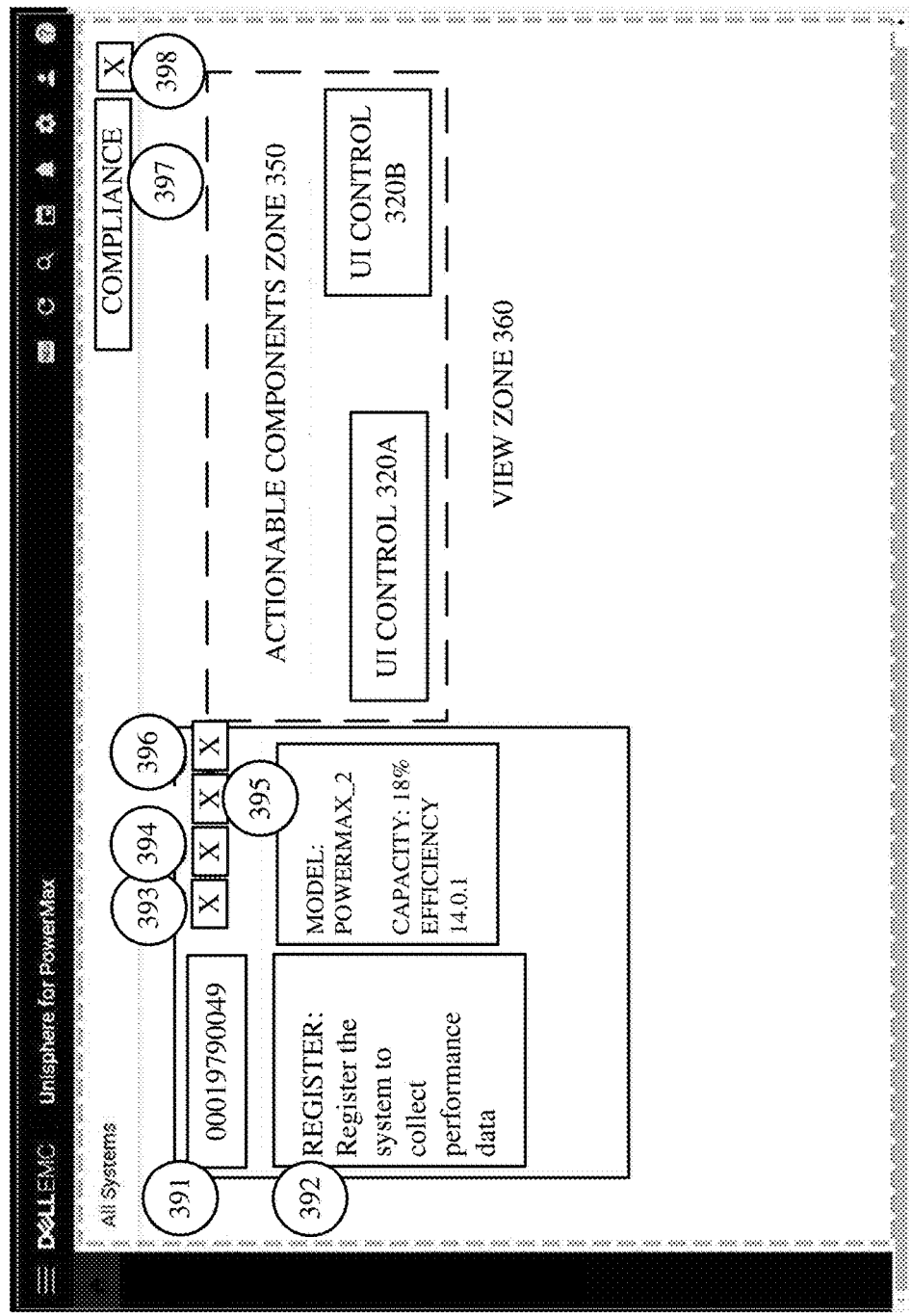
FIG. 3 depicts an example single-page application page, with zones for UI controls identified, in accordance with one or more embodiments described herein.

FIG. 3 depicts an example single-page application page 300, with zones for UI controls 391-398 and zones 350-360 identified, in accordance with one or more embodiments described herein. For purposes of brevity, description of like elements and/or processes employed in other embodiments is omitted.

UI page 300 can include actionable components zone 350, with UI input controls that can include, but are not limited to, clickable links, buttons, drop down boxes, check boxes, text boxes, and other UI controls, as well as view zone 360 components, where, for example, new data (e.g., the results of the manipulation of actionable components zone 350) can be displayed. UI page 300 can further include view zone 360 components, this zone being, in some circumstances, an area where different data can be viewed based on application 125 execution. It should be noted that both zones 350-360, as zones where application 125 can transition both user controls and content, can be one of the features of the single-page application, e.g., an application with fewer URL transitions and more screen zone transitions. For an example below, actionable components zone 350 also includes UI controls 320A-B, these being, in an example, UI controls with different shapes, different colors, and of a different HTML type.

In the example depicted, zones 391-398 each include a single UI control, e.g., zone 396 being a bell button and zone 397 being a drop-down box. In one or more embodiments, the structure of this UI (e.g., placement information for UI element) can be stored in UI zone mapping 290, for combination with data 152 by data combiner 214. Example characteristics stored and available for combination can include all of the identifying data generated upon triggering of the zone-based event, e.g., ng-click can provide a zone number, the HTML element type, its position, and size of the element on the page.

In an alternative embodiment (not shown) the data of UI zone mapping 290 and the functions of data combiner 214 can be available at device 150. In this approach, the identification of UI components having events could be performed at device 150, and data 152 could comprise data similar to log data 155, e.g., with identifiers procedurally generated either during the run-time of application 125 or generated based on an analysis of activity data collected by data collector 126. One having skill in the relevant art(s), given the disclosure herein would appreciate that the analysis and combining functions described above can be flexibly performed by both device 150 and application server 178, based on implementation decisions associated with one or more embodiments.

Returning to UI controls 320A-B, it should be noted that, unlike UI controls in zones 391-398, UI controls 320A-B share the same zone 350. In an example where UI control 320A is clicked on, the above-described zone-based event can be triggered, and data including reference to zone 350 can be provided to data collector 126 for logging purposes. In this example, however, this zone indication can apply to both UI control 320A-B. To provide more specific identification, the zone-based event can provide, and data collector 126 can store the above noted UI characteristics (e.g., UI controls 320A-B are of different colors and shapes), as well as the spatial location of the event-triggering IU control, e.g., in either relative or absolute terms in the zone 360 or on the full UI page 300. Based at least the disclosure herein, one having skill in the art will appreciate the flexibility with which one or more embodiments can be implemented.

FIG. 4 depicts an example 400 of ANGULAR JS code that can implement the identification of a particular UI control based on the event output of the ng-click event described above, in accordance with one or more embodiments. For purposes of brevity, description of like elements and/or processes employed in other embodiments is omitted.

This example code is designed to listen for the occurrence of an event (e.g., label 440) and upon detection of an event, to capture characteristics of the UI control associated with the event, e.g., label 415 highlights an example of reading the zone of the control that generated the event, and label 430 highlights four lines of code that read relative measures of the offset of the UI control from the edges of UI page 300. As described with FIG. 3 above, either or both of these values, when combined with information about the user interface, can identify the UI control that caused the event.

FIG. 5 depicts an example JSON file 500 that can include example activity log data for a UI, in accordance with one or more embodiments. For purposes of brevity, description of like elements and/or processes employed in other embodiments is omitted.

Figure 6:
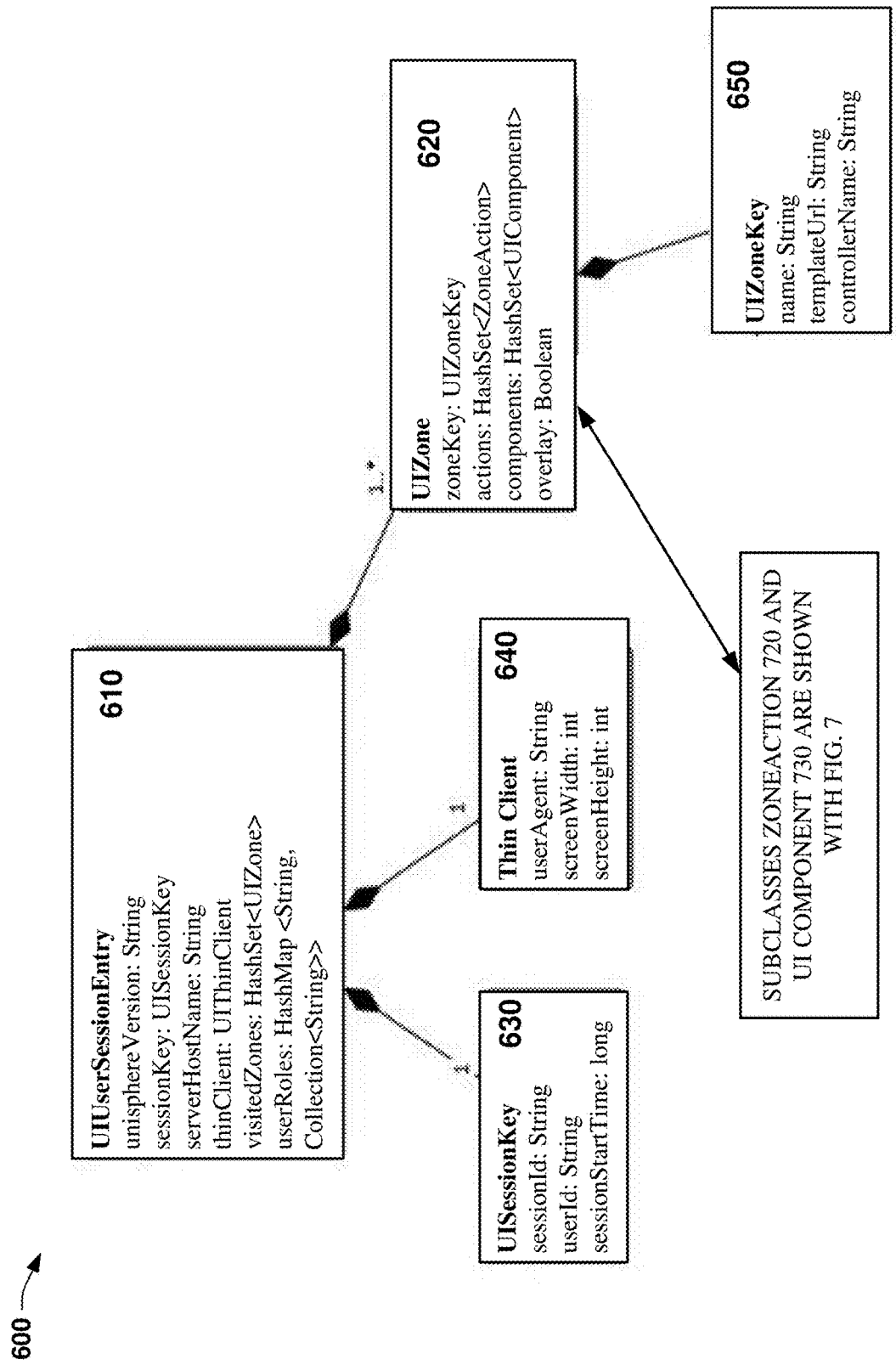
FIGS. 6-7 respectively depict portions of a class diagram of an implementation of different, related data objects that can facilitate logging UI activity for a thin-client application, in accordance with one or more embodiments.
Figure 7:
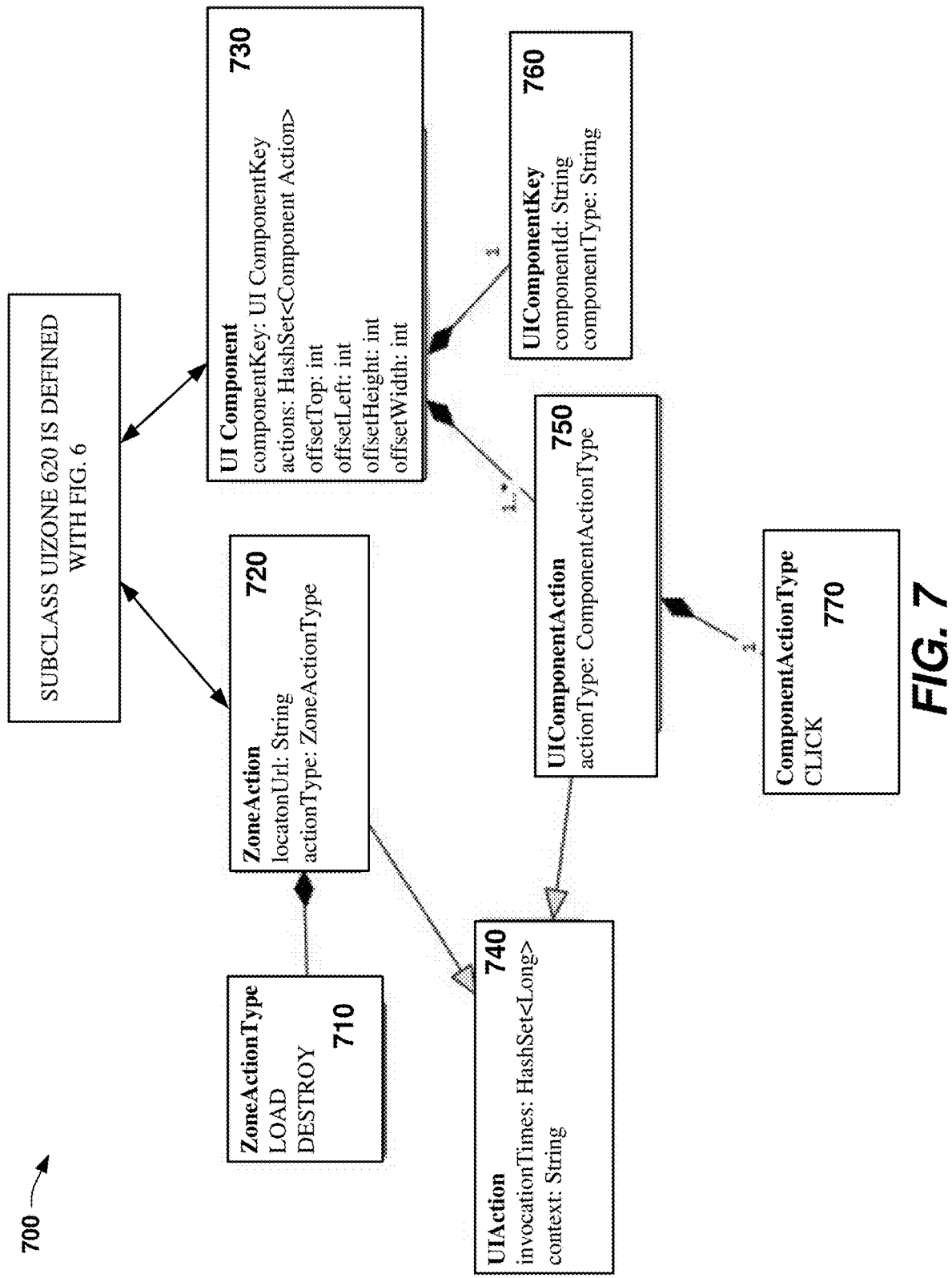

As described with FIGS. 1 and 2 above, or more embodiments can be used collect UI activity data for communication to application server 178. Examples throughout this disclosure involve the transport of log data from a client device to a server device for analysis. To illustrate generally how different types of data can be formatted (e.g., by using JSON), and specifically, how log data can be formatted, FIG. 5 includes a portion of data 152 to be transported. One having skill in the relevant art(s), given the description herein, will appreciate the structure of JSON, and that other formats can be used to encode data for transport by one or more embodiments described herein FIGS. 6-7 respectively depict portions 600 and 700 of a class diagram of an implementation of different, related data objects that can facilitate logging UI activity for a thin-client application, in accordance with one or more embodiments. For purposes of brevity, description of like elements and/or processes employed in other embodiments is omitted.

Figure 8:
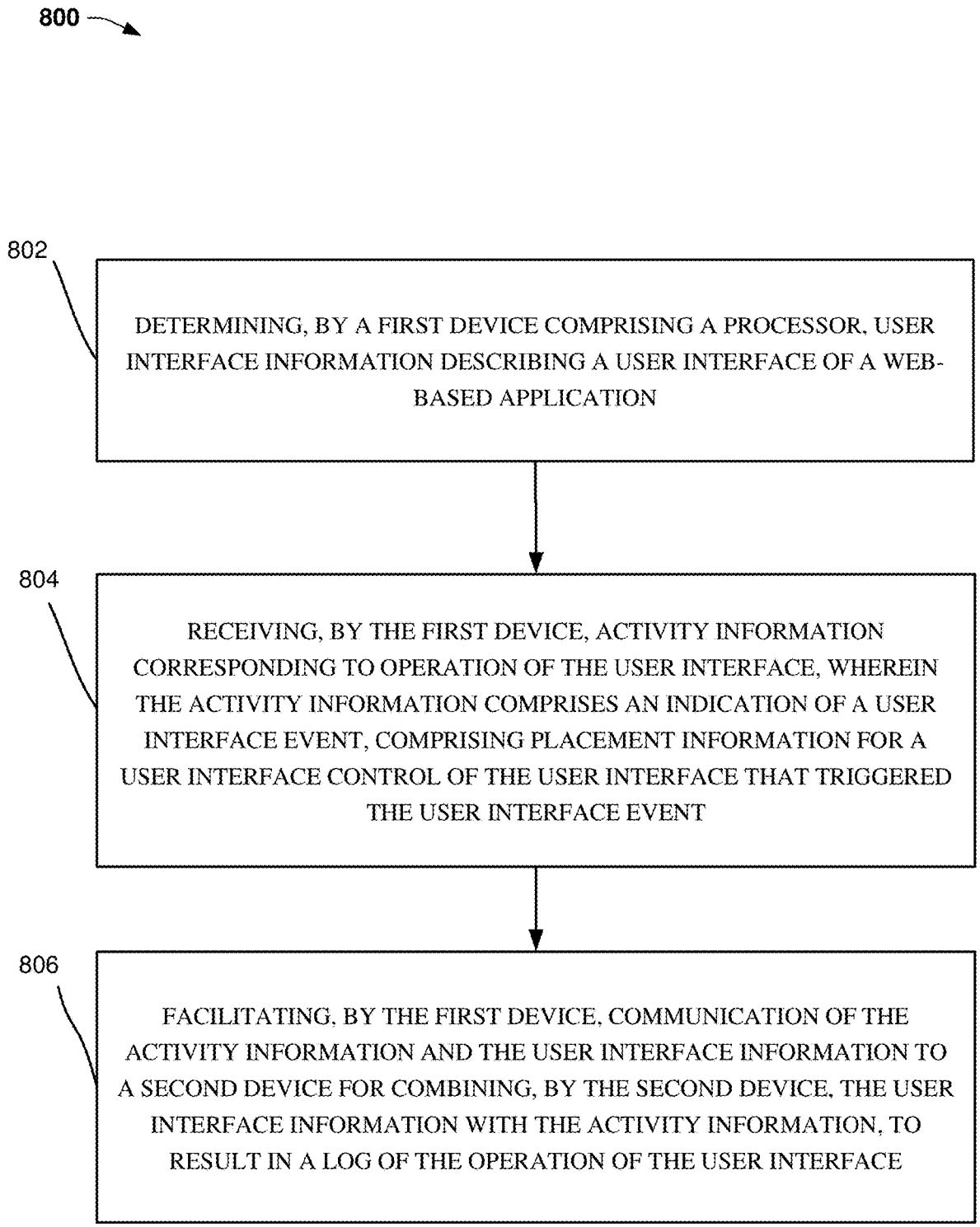
FIG. 8 illustrates an example flow diagram for a method that can facilitate identifying and logging the use of an application UI, in accordance with one or more embodiments.

The classes and subclasses 610-650 and 710-770 are example data structures that can hold activity data for combination with other data sources. For example, UIUserSessionEntry 610 is comprised of a UISessionKey 630 subclass, a thin client 640 subclass, and a UIZone 620 subclass, in accordance with one or more embodiments. One having skill in the relevant art(s), given description of FIG. 7 below, will understand the different data structures that can be used by one or more embodiments FIG. 8 illustrates an example flow diagram for a method 800 that can facilitate identifying and logging the use of an application UI, in accordance with one or more embodiments. For purposes of brevity, description of like elements and/or processes employed in other embodiments is omitted.

At element 802, method 800 can comprise determining, by a first device comprising a processor, user interface information describing a user interface of a web-based application. In an embodiment, method 800 can comprise determining, by a first device 150 comprising a processor 160, user interface information (e.g., UI zone mapping 290) describing a user interface of a web-based application, e.g., UI page 300.

At element 804, method 800 can comprise receiving, by the first device, activity information (e.g., operation of UI controls 290A-B) corresponding to operation of the user interface, wherein the activity information comprises an indication of a user interface event (e.g., an ng-click event), comprising placement information for a user interface control of the user interface that triggered the user interface event.

At element 806, method 800 can comprise facilitating, by the first device, communication of the activity information and the user interface information to a second device (e.g., application server 178) for combining (e.g., by data combiner 214), by the second device, the user interface information with the activity information, to result in a log of the operation of the user interface, e.g., log data 155.

Figure 9:
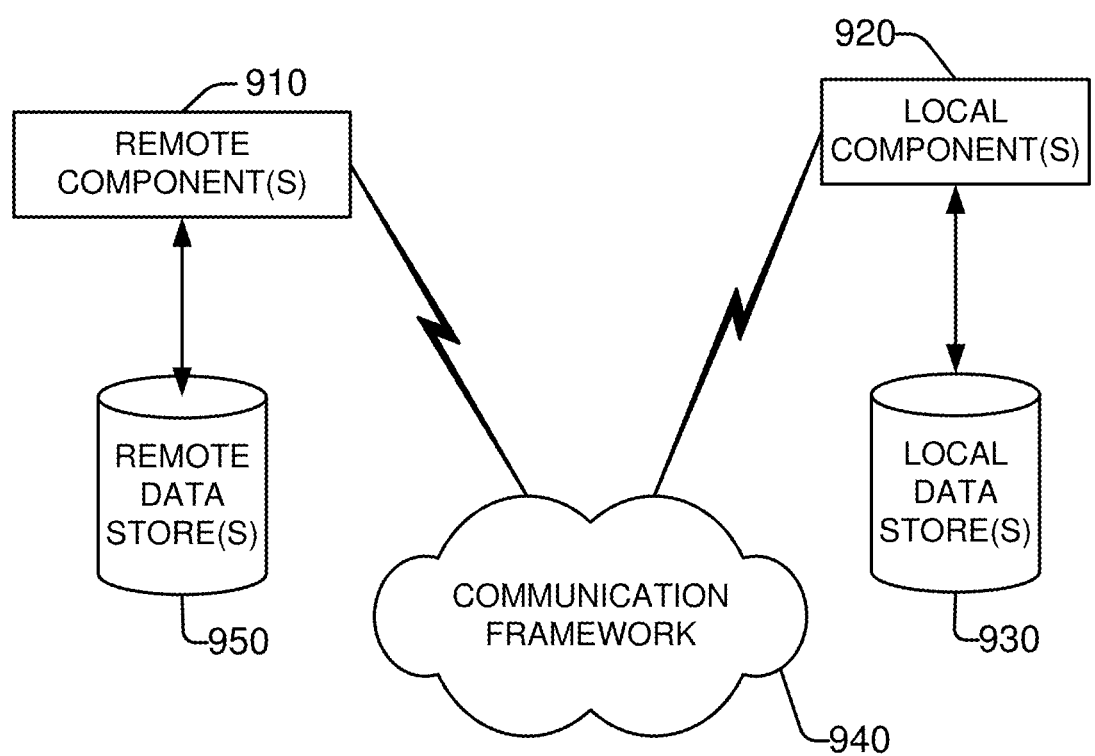
FIG. 9 depicts an example schematic block diagram of a computing environment with which the disclosed subject matter can interact, in accordance with one or more embodiments.

FIG. 9 is a schematic block diagram of a system 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices).

One possible communication between a remote component(s) 910 and a local component(s) 920 can be in the form of a data packet adapted to be transmitted between two or more computer processes. Another possible communication between a remote component(s) 910 and a local component (s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

In order to provide a context for the various aspects of the disclosed subject matter, FIG. 8, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage, e.g., local data store(s) 930 and remote data store(s) 950, see below. Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 10:
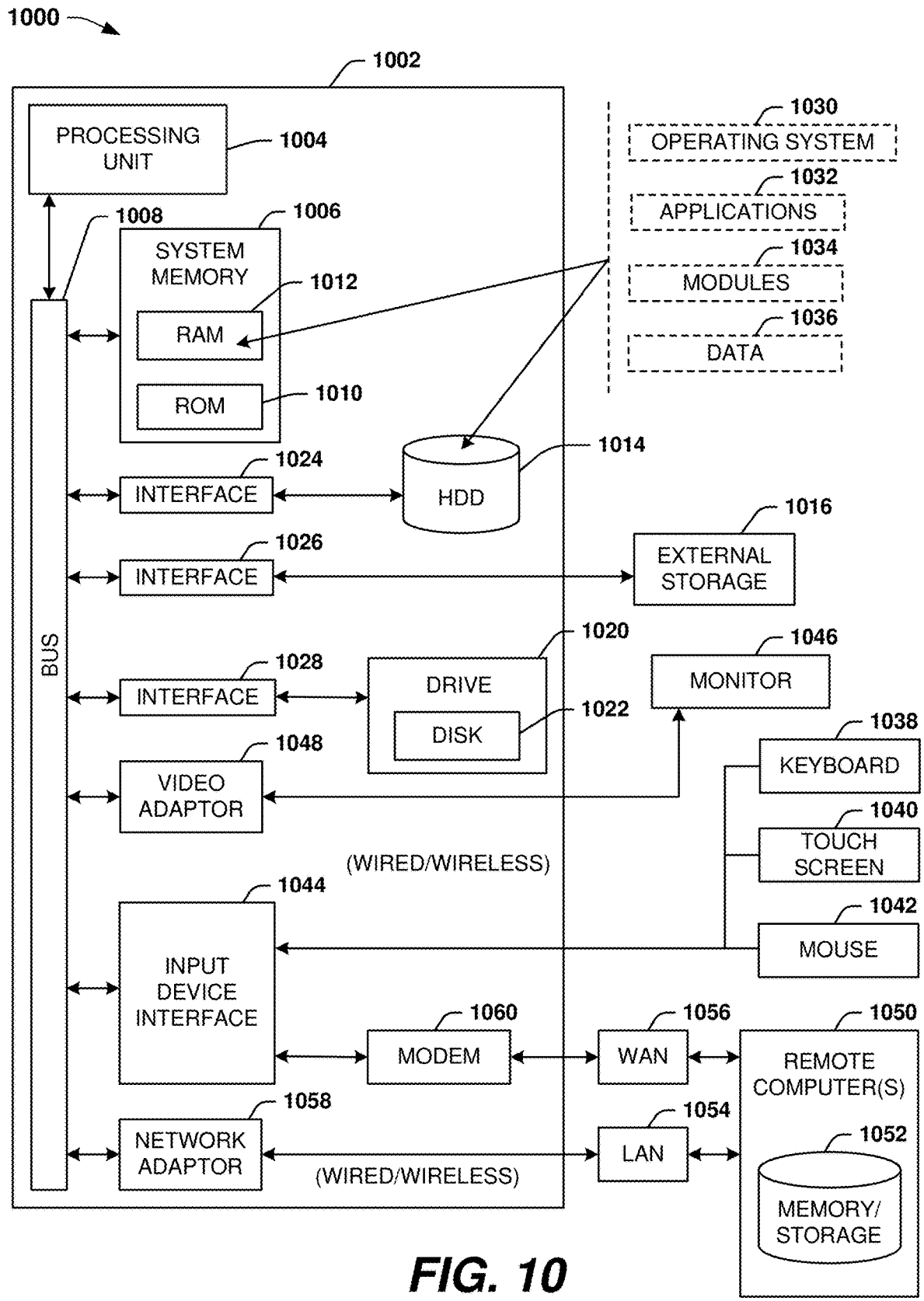
FIG. 10 illustrates an example block diagram of a computing system operable to execute the disclosed systems and methods in accordance with various aspects and implementations of the subject disclosure.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid state drive, an optical disk drive, which can read or write from a disk 1022, such as a CD-ROM disc, a DVD, a BD, etc. Alternatively, where a solid-state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches, and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While embodiments are susceptible to various modifications and alternative constructions, certain illustrated implementations thereof are shown in the drawings and have been described above in detail. It should be understood, however, that there is no intention to limit embodiments to the specific forms disclosed, but on the contrary, the intention is to cover all modifications, alternative constructions, and equivalents falling within the spirit and scope of embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, embodiments are not to be limited to any single implementation, but rather is to be construed in breadth, spirit, and scope in accordance with the appended claims.

What is claimed is:

1. A device, comprising:
   a processor; and
   a memory that stores executable instructions that, when executed by the processor, facilitate performance of operations, comprising:
      receiving user interface information describing a user interface of a web application;
      receiving activity information corresponding to operation of the user interface, wherein the activity information comprises an indication of a user interface event and placement information for a user interface control of the user interface that triggered the user interface event, wherein the placement information comprises a defined zone of the user interface where a displayed position of the user interface control is located, and coordinates of the displayed position, wherein the user interface information comprises the defined zone, wherein the placement information for the user interface control further comprises a size of the user interface control, and wherein the size of the user interface control comprises a relative size of the user interface control compared to the user interface;

based on the defined zone, the placement information, and the indication of the user interface event, generating an identifier that identifies the user interface control as different from other user interface controls of the user interface; and combining the identifier with the activity information, resulting in a log of the operation of the user interface.

2. The device of claim 1, wherein the user interface control is generated based on hypertext markup code without the identifier assigned to the user interface control, and wherein the log of the operation of the user interface comprises the identifier and the indication of the user interface event.

3. The device of claim 1, wherein the user interface is displayed on a single web page with code of the user interface being retrieved for display by a single page load.

4. The device of claim 1, wherein the placement information for the user interface control further comprises a hypertext markup language element type of the user interface control.

5. The device of claim 1, wherein the coordinates of the displayed position of the user interface control in the user interface comprise grid coordinates corresponding to displayed pixels of the user interface.

6. The device of claim 1, wherein the user interface control comprises a graphical button, and wherein the user interface event is a click of the graphical button by a graphical pointer.

7. A method, comprising:

determining, by a first device comprising a processor, user interface information describing a user interface of a web-based application;

facilitating, by the first device, receiving activity information corresponding to operation of the user interface, wherein the activity information comprises an indication of a user interface event and placement information for a user interface control of the user interface that triggered the user interface event, wherein the placement information comprises a defined zone of the user interface where a displayed position of the user interface control is located, and coordinates of the displayed position, wherein the user interface information comprises the defined zone, wherein the placement information for the user interface control further comprises a size of the user interface control, and wherein the size of the user interface control comprises a relative size of the user interface control compared to the user interface;

based on the defined zone, the placement information, and the indication of the user interface event, generating, by the first device, an identifier that identifies the user interface control as different from other user interface controls of the user interface; and facilitating, by the first device, communication of the activity information and the user interface information to a second device for combining, by the second device, the identifier with the activity information, to result in a log of the operation of the user interface.

8. The method of claim 7, wherein the placement information for the user interface control comprises the defined zone of the user interface where the user interface control is located, and wherein the user interface information comprises the placement information.

9. The method of claim 8, wherein the user interface control is generated based on hypertext markup code without the identifier assigned to the user interface control, and wherein the log of the operation of the user interface comprises the generated identifier and the indication of the user interface event.

10. The method of claim 7, wherein the user interface is displayed on a single web page with code of the user interface being retrieved for display by a single page load.

11. The method of claim 7, wherein the placement information for the user interface control further comprises a position of the user interface control in relation to other displayed controls.

12. The method of claim 7, wherein the coordinates of the displayed position of the user interface control in the user interface comprise grid coordinates corresponding to displayed pixels of the user interface.

13. The method of claim 7, wherein the user interface control comprises a graphical button, and wherein the user interface event is a click of the graphical button by a graphical pointer.

14. A non-transitory machine-readable medium, comprising executable instructions that, when executed by a processor of a first device, facilitate performance of operations, comprising:

receiving user interface information describing a user interface of an application;

receiving activity information corresponding to operation of the user interface, wherein the activity information comprises an indication of a user interface event and placement information for a user interface control of the user interface that triggered the user interface event, wherein the placement information comprises a defined zone of the user interface where a displayed position of the user interface control is located, and coordinates of the displayed position, wherein the user interface information comprises the defined zone, wherein the placement information for the user interface control further comprises a size of the user interface control, and wherein the size of the user interface control comprises a relative size of the user interface control compared to the user interface;

based on the defined zone, the placement information, and the indication of the user interface event, generating an identifier that identifies the user interface control as different from other user interface controls of the user interface; and combining the identifier with the activity information, resulting in logged information representative of the operation of the user interface.

15. The non-transitory machine-readable medium of claim 14, wherein the application is a web-based application, and wherein the operation of the user interface comprised displaying the user interface of the web-based application on a single web page, with code of the user interface being retrieved with a single page load.

16. The non-transitory machine-readable medium of claim 14, wherein the receiving the user interface information comprises receiving the user interface information from a second device; and wherein the operations further comprise facilitating communication of the logged information to the second device.

17. The non-transitory machine-readable medium of claim 14, wherein the coordinates of the displayed position of the user interface control in the user interface comprise grid coordinates corresponding to displayed pixels of the user interface.

18. The non-transitory machine-readable medium of claim 14, wherein the user interface control comprises a graphical button, and wherein the user interface event is a click of the graphical button by a graphical pointer.

19. The non-transitory machine-readable medium of claim 14, wherein the placement information for the user interface control comprises the defined zone of the user interface where the user interface control is located, and wherein the user interface information comprises the placement information.

20. The non-transitory machine-readable medium of claim 14, wherein the user interface control is generated based on hypertext markup code without the identifier assigned to the user interface control, and wherein the log of the operation of the user interface comprises the generated identifier and the indication of the user interface event.

* * * * *